(12) United States Patent
Zhao et al.

(10) Patent No.: US 12,217,438 B2
(45) Date of Patent: Feb. 4, 2025

(54) IMAGE PROCESSING APPARATUS AND METHOD FOR FEATURE EXTRACTION

(71) Applicant: HUAWEI TECHNOLOGIES CO., LTD., Guangdong (CN)

(72) Inventors: Zhijie Zhao, Munich (DE); Yuntan Fang, Beijing (CN); Jun Zha, Shenzhen (CN); Hu Chen, Munich (DE); Jiantong Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 648 days.

(21) Appl. No.: 17/174,536

(22) Filed: Feb. 12, 2021

(65) Prior Publication Data
US 2021/0174092 A1    Jun. 10, 2021

Related U.S. Application Data

(63) Continuation of application No. PCT/CN2018/100381, filed on Aug. 14, 2018.

(51) Int. Cl.
*G06K 9/00*    (2022.01)
*G06T 3/40*    (2006.01)
*G06T 7/20*    (2017.01)
*G06T 7/254*   (2017.01)
*G06V 20/40*   (2022.01)

(52) U.S. Cl.
CPC ........... *G06T 7/254* (2017.01); *G06T 3/40* (2013.01); *G06T 7/20* (2013.01); *G06V 20/46* (2022.01); *G06T 2207/10016* (2013.01); *G06T 2207/20016* (2013.01); *G06T 2207/20084* (2013.01); *G06T 2207/20221* (2013.01)

(58) Field of Classification Search
None
See application file for complete search history.

(56) References Cited

U.S. PATENT DOCUMENTS 9,817,507 B2    11/2017  Park et al.
2016/0356890 A1*  12/2016  Fried ............... G01S 7/4863
(Continued)

FOREIGN PATENT DOCUMENTS

CN    101119482 A    2/2008
CN    101616310 A    12/2009
(Continued)

OTHER PUBLICATIONS

Office Action in Chinese Appln. No. 201880096186.1, dated Oct. 19, 2022, 15 pages (with English translation).
Brandli et al., "A 240 x 180 130 dB 3 μs Latency Global Shutter Spatiotemporal Vision Sensor," IEEE Journal of Solid-State Circuits, vol. 49, No. 10, Oct. 2014, 9 pages.
(Continued)

*Primary Examiner* — Wei Wen Yang
(74) *Attorney, Agent, or Firm* — Fish & Richardson P.C.

(57) ABSTRACT

Embodiments of this application disclose example apparatuses, methods, and computer program products for extracting a feature from an image of a scene. One example apparatus comprises at least one processor and one or more memories coupled to the at least one processor and storing programming instructions for execution by the at least one processor to, in response to a feature extraction event, extract a feature from first image data representing a first image of a scene, wherein the feature extraction event is based on second image data representing a second image of the scene.

17 Claims, 10 Drawing Sheets

(56) References Cited

U.S. PATENT DOCUMENTS

| | | | | |
|---|---|---|---|---|
| 2018/0372499 | A1* | 12/2018 | Ali | ............ G06T 7/248 |
| 2019/0007678 | A1* | 1/2019 | Perez-Ramirez | .... H04N 19/126 |

FOREIGN PATENT DOCUMENTS

| | | |
|---|---|---|
| CN | 201937736 U | 8/2011 |
| CN | 102891960 A | 1/2013 |
| CN | 103152518 A | 6/2013 |
| CN | 103179350 A | 6/2013 |
| CN | 103391424 A | 11/2013 |
| CN | 103578116 A | 2/2014 |
| CN | 104170369 A | 11/2014 |
| CN | 104284158 A | 1/2015 |
| CN | 104408725 A | 3/2015 |
| CN | 105141841 A | 12/2015 |
| CN | 106826846 A | 6/2017 |
| CN | 107016353 A | 8/2017 |
| CN | 107395997 A | 11/2017 |
| CN | 107430441 A | 12/2017 |
| CN | 107563961 A | 1/2018 |
| CN | 107786838 A | 3/2018 |
| CN | 107886521 A | 4/2018 |
| CN | 108027887 A | 5/2018 |
| CN | 108289201 A | 7/2018 |
| IN | 201717015224 A | 9/2017 |
| WO | 2015168058 A1 | 11/2015 |

OTHER PUBLICATIONS

PCT International Search Report and Written Opinion issued in International Application No. PCT/CN2018/100381 on May 15, 2019, 9 pages.

Takagi et al., "Optimized spatial and temporal resolution based on subjective quality estimation without encoding," 2014 IEEE Visual Communications and Image Processing Conference, Dec. 7-10, 2014, 4 pages.

Office Action issued in Chinese Application No. 201880096186.1 on Jul. 13, 2021, 16 pages (with English translation).

Censi et al, "Low-Latency Event-Based Visual Odometry," 2014 IEEE International Conference on Robotics and Automation (ICRA), Hong Kong Convention and Exhibition Center, May 31-Jun. 7, 2014. Hong Kong, China, 8 pages.

Bardow et al, "Simultaneous Optical Flow and Intensity Estimation from an Event Camera," 2016 IEEE Conference on Computer Vision and Pattern Recognition, Dec. 12, 2016, 9 pages.

Mueggler et al., "Continuous-Time Visual-Inertial Trajectory Estimation with Event Cameras," Robotics: Science and Systems 2015, Feb. 23, 2017, 14 pages.

Extended European Search Report in European Application No. 18930015.5, dated Jun. 22, 2021, 8 pages.

Tao et al., "An Image Fusion Algorithm Based on Correlation for Video Sensor Networks," Journal of Computer-Aided Design & Computer Graphics, vol. 19, No. 5, May 2007, 6 pages (with English abstract).

* cited by examiner

IMAGE PROCESSING APPARATUS AND METHOD FOR FEATURE EXTRACTION

CROSS-REFERENCE TO RELATED APPLICATIONS

This application is a continuation of International Application No. PCT/CN2018/100381, filed on Aug. 14, 2018, the disclosure of which is hereby incorporated by reference in its entirety.

TECHNICAL FIELD

Generally, the present invention relates to the field of image processing. More specifically, the present invention relates to an image processing apparatus and method for extracting features from still images or images of video frames.

BACKGROUND

The amount of video and image data has increased dramatically over recent years and continues to grow. Many vision applications based on video or image data require accurate and efficient analysis of the data. Much work has been recently devoted to automatic video/image analysis and recognition for different purposes. One of the important parts for automatic video/image processing is feature extraction, involving principal component analysis (PCA), deep learning or neural-network based methods, histograms of optical flow (HOF), histograms of 3D gradients, motion boundary histograms, local trinary patterns, motion estimation at dense grid and the like. However, most of these methods are time-consuming processes that limit the speed and the accuracy of feature extraction.

Event-driven cameras (also referred to as event cameras or event camera sensors) are triggered by objects or events that are interesting for video/image analysis and processing, and allow providing video characteristics in a more straight-forward manner, which can spare the need of further analysis algorithms.

In conventional feature extraction approaches features are generally extracted on the basis of an output of a standard image sensor. For instance, the known feature extraction method SURF (speeded up robust features) uses a local feature detector and descriptor. Moreover, conventional feature extraction approaches normally compute the feature based on the whole image as the input. As this often requires substantial computational resources, there is still a need for an improved image processing apparatus and method allowing for a computationally more efficient extraction of features from still images or images of video frames.

SUMMARY

It is an object of the invention to provide an improved image processing apparatus and method allowing for a computationally more efficient extraction of features from still images or images of video frames.

The foregoing and other objects are achieved by the subject matter of the independent claims. Further implementation forms are apparent from the dependent claims, the description and the figures.

Generally, embodiments of the invention take advantage of image/video characteristics obtained from event-driven cameras for conducting feature extraction for video/image analysis and object/action recognition. Embodiments of the invention use a combination of an event-driven sensor and a conventional CMOS sensor. According to embodiments of the invention this could be a dual-sensor setup in a single camera or it could be a setup of two cameras very close to each other or a setup of two cameras very close to each other with a combination at the image pixel/sample level.

According to embodiments of the invention motion statistics and intensity change information can be obtained or extracted from the event-driven camera output and used for identifying the object whose features need to be extracted. In other words, the statistics extracted from the event-driven camera can be used to determine the object of the image data from a standard image sensor for feature extraction. According to embodiments of the invention the feature of the identified object of the image data from a standard image sensor can be extracted by a feature extraction method, such as a neural network-based feature extraction method or any conventional feature extraction method.

The combination of an event-driven camera and a conventional CMOS camera implemented in embodiments of the invention has two main advantages. On the one hand, the sensitivity of the event-driven camera to moving objects leads to fast and accurate detection, which facilitates the identification of the objects of interest form the output of the CMOS camera. On the other hand, the CMOS camera with an intrinsic high resolution and enhanced by the results of the event-driven camera can process a video which is more optimized for machine vision. According to embodiments of the invention the identification of the objects of interest by usage of the output of the event-driven camera could be used to extract the feature of the identified object directly without additional computations based on the image of CMOS sensor/camera.

More specifically, according to a first aspect the invention relates to an image processing apparatus for extracting a feature of an object from an image of a scene. The apparatus comprises processing circuitry configured, in response to a feature extraction event, to extract a feature of an object from first image data representing a first image of a scene, wherein the feature extraction event is based on second image data representing a second image of the scene. In an embodiment, the processing circuitry can comprise one or more processors.

In a possible implementation form of the first aspect, the second image data or event signal data may include a positive/negative amount of the intensity change and the location of the intensity change.

Thus, an improved image processing apparatus is provided allowing for a computationally more efficient extraction of features of objects from still images or images of video frames, because generally only a part of the image which contains the object of interest is used for feature calculation and only the features of certain objects are extracted.

As used herein, a "feature" could be edge, color, texture, or the combination of edge, color, texture, or vector, or a layer or output from a neural network, etc., which can be mapped to detect or recognize or analyze an object. These features can then be compared to features in unknown images to detect and classify unknown objects therein.

In a further possible implementation form of the first aspect, the feature extraction event is triggered by the reception of a feature extraction event signal by the apparatus, wherein the feature extraction event signal comprises information about the location of the feature to be extracted from the first image data.

In a further possible implementation form of the first aspect, the processing circuitry is configured to determine on the basis of the second image data whether a feature extraction condition is fulfilled and to trigger the feature extraction, if the feature extraction condition is fulfilled.

In a further possible implementation form of the first aspect, the image is one of a plurality of images of a video stream, wherein the processing circuitry is further configured to determine motion statistics and/or sample value change information on the basis of the second image data and to determine on the basis of the motion statistics and/or the sample value change information whether the feature extraction condition is fulfilled.

In a further possible implementation form of the first aspect, the processing circuitry is configured to determine on the basis of the motion statistics and/or the sample value change information whether the feature extraction condition is fulfilled by comparing the motion statistics and/or the sample value change information with one or more threshold values.

In a further possible implementation form of the first aspect, the apparatus comprises an imaging sensor configured to capture an image of the scene comprising a plurality of sample values and to provide the first image data as a first subset of the plurality of sample values and the second image data as a second complimentary subset of the plurality of sample values. Thus, one sensor provides both the first and the second image data.

In a further possible implementation form of the first aspect, the apparatus further comprises a spatial filter configured to spatially filter the image for providing the first image data as the first subset of the plurality of sample values and the second image data as the second subset of the plurality of sample values.

In a further possible implementation form of the first aspect, the apparatus comprises a first imaging sensor and a second imaging sensor, wherein the first imaging sensor is configured to capture the first image of the scene and to provide the first image data and wherein the second imaging sensor is configured to capture the second image of the scene and to provide the second image data. Thus, in an embodiment the first image data and the second image data can be provided by two different sensors.

In a further possible implementation form of the first aspect, the first image captured by the first imaging sensor has a higher resolution than the second image captured by the second imaging sensor.

In a further possible implementation form of the first aspect, the processing circuitry is further configured to downsample the first image to the lower resolution of the second image.

In a further possible implementation form of the first aspect, the first imaging sensor is a CMOS sensor and the second imaging sensor is an event sensor.

In a further possible implementation form of the first aspect, the processing circuitry is further configured to identify in the first image data the feature for which the feature extraction condition is fulfilled on the basis of the second image data. In other words, the second image data can provide the processing circuitry with information about a feature to be extracted from the first image, i.e. the first image data, such as information about the position of a feature to be extracted.

In a further possible implementation form of the first aspect, the first image data comprises a first plurality of sample values and the second image data comprises a second plurality of sample values, wherein the processing circuitry is further configured to map, i.e. register the first plurality of sample values with the second plurality of sample values. Geometric correction based on the setup and parameters (such as field of view, focal length, etc.) could be performed before registration.

In a further possible implementation form of the first aspect, the processing circuitry is further configured to generate a composite image by fusing the first image and the second image.

In a further possible implementation form of the first aspect, the processing circuitry is further configured to generate the composite image by fusing the first image and the second image after separately performing signal processing, in particular image processing on the first image and the second image.

In a further possible implementation form of the first aspect, the processing circuitry implements a neural network, wherein the neural network is configured to extract on the basis of the second image data the feature from the first image of the scene.

According to a second aspect the invention relates to a corresponding image processing method for extracting a feature from an image of a scene. The method comprises the step of extracting, in response to a feature extraction event, a feature from first image data representing a first image of a scene, wherein the feature extraction event is based on second image data representing a second image of the scene.

The image processing method according to the second aspect of the invention can be performed by the image processing apparatus according to the first aspect of the invention. Further features of the image processing method according to the second aspect of the invention result directly from the functionality of the image processing apparatus according to the first aspect of the invention and its different implementation forms.

According to a third aspect the invention relates to a computer program comprising program code for performing the image processing method according to the second aspect, when executed on a processor or a computer.

The invention can be implemented in hardware and/or software.

BRIEF DESCRIPTION OF THE DRAWINGS

Further embodiments of the invention will be described with respect to the following figures, wherein:

FIG. 4a shows a schematic diagram illustrating a further embodiment of the image processing apparatus of FIG. 1a;

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1A:
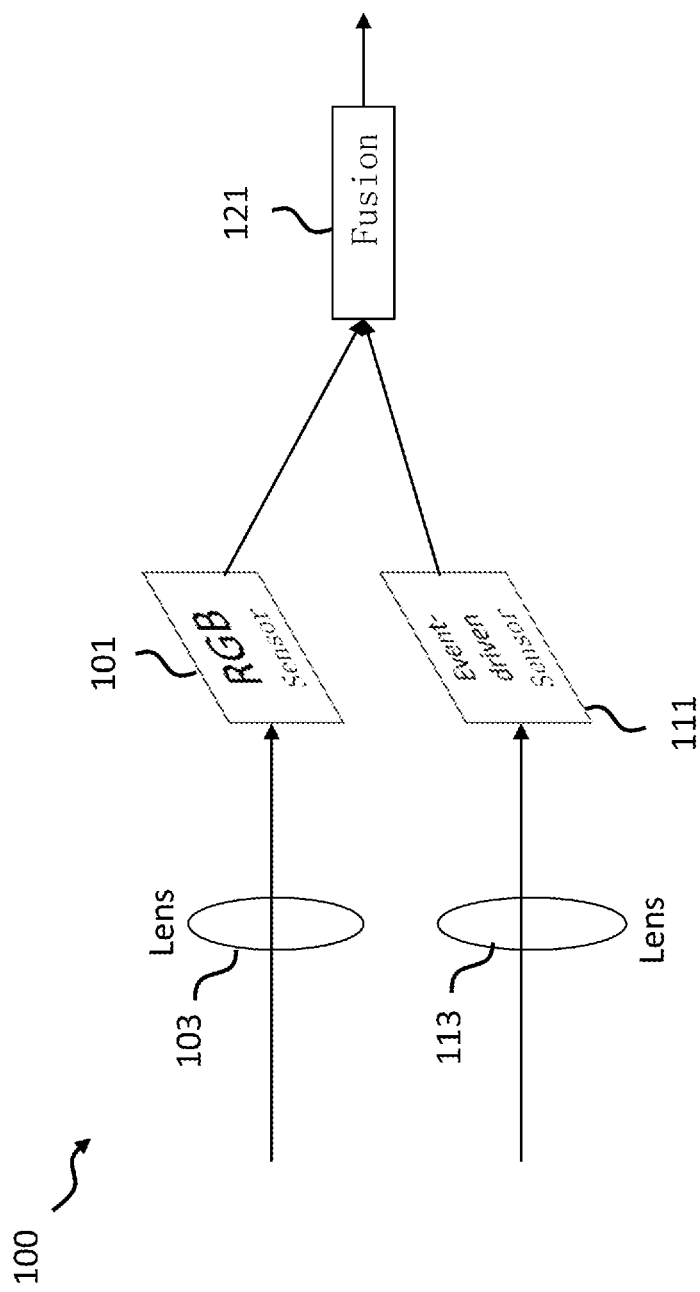
FIG. 1a shows a schematic diagram illustrating an example of an image processing apparatus according to an embodiment.
Figure 1B:
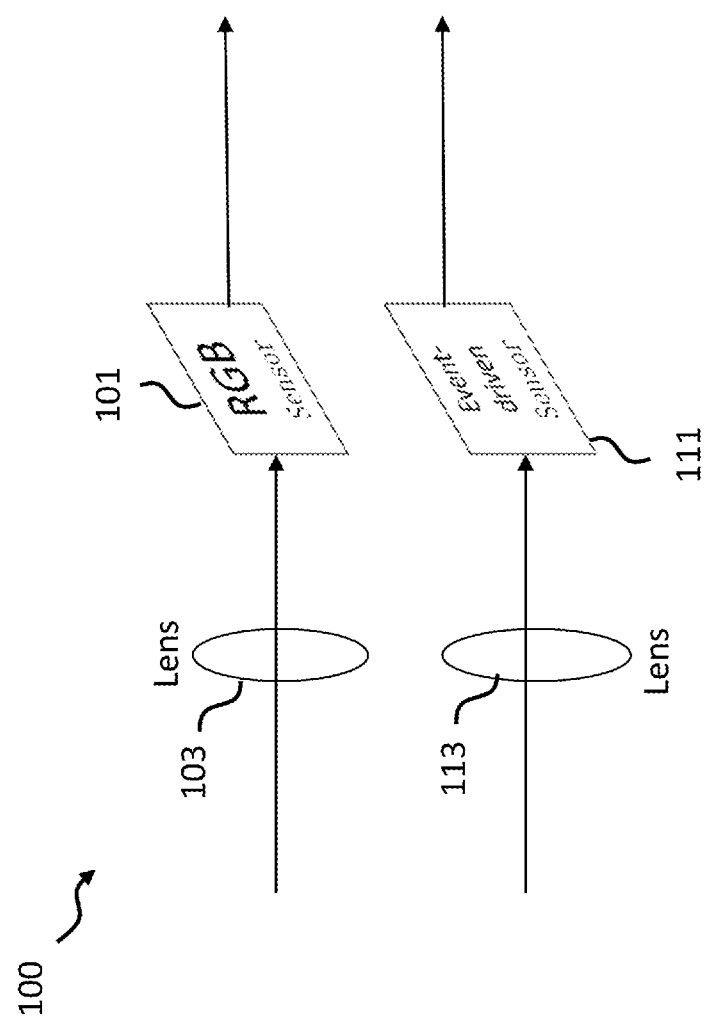
FIG. 1b shows a schematic diagram illustrating an example of an image processing apparatus according to an embodiment.
Figure 2:
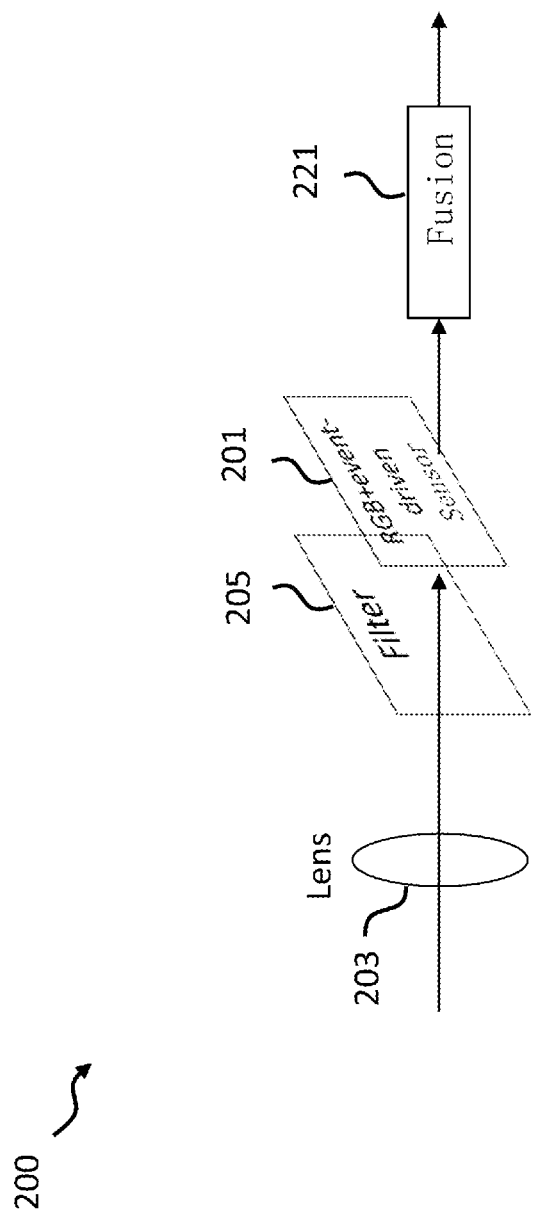
FIG. 2 shows a schematic diagram illustrating an example of an image processing apparatus according to an embodiment.

As will be described in more detail further below, FIGS. 1*a* and 2 show two embodiments of an image processing apparatus 100, 200 based on a combination of an event-driven sensor and a standard imaging sensor, such as a CMOS sensor. The image processing apparatus 100 of FIG. 1*a* is an example for the combination of a dual-sensor set up, where each sensor has its own optics and sensor. The image processing apparatus 200 of FIG. 2 is an example of the combination by single-sensor set up, where the single-sensor captures both standard image and event information. In both cases, the standard image and event information can be merged, i.e. at some stage to generate a single image, i.e. in processing block 121 of FIG. 1*a* and in processing block 221 of FIG. 2. A further embodiment of the image processing apparatus 100 is shown in FIG. 1*b* without merging of the standard image and event information in a fusion block 121.

In the embodiments shown in FIGS. 1*a* and 1*b* the image processing apparatus 100 can comprise one or more optical elements, in particular lenses 103, 113 for providing two distinct optical paths for the standard imaging sensor 101 and the event driven sensor 111. In a further embodiment of the image processing apparatus 100 shown in FIG. 1*c*, the image processing apparatus 100 can comprise an optical splitter or a dedicated prism 106 for splitting a single optical path into two distinct optical paths, namely one for the standard imaging sensor 101 and one for the event driven sensor 111. Specifically for the embodiment in FIG. 1*b*, the output of the event information from the event sensor 111 can be used to adjust the output of the standard imaging, e.g. RGB sensor 101. For example, based on the event identified from the output of the event sensor 111, the frame rate, resolution or other parameters of the RGB sensor 101 could be adjusted accordingly.

Figure 1C:
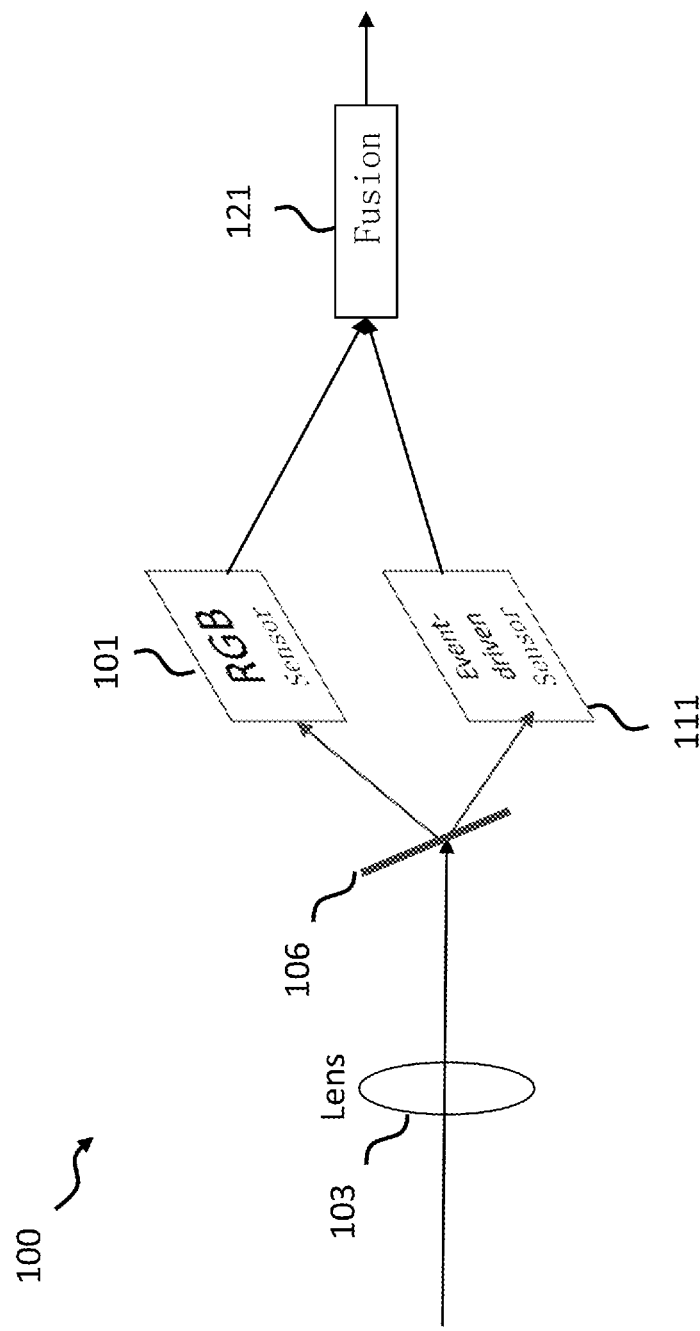
FIG. 1c shows a schematic diagram illustrating an example of an image processing apparatus according to an embodiment.

More specifically, FIGS. 1*a*,1*b* and 1*c* show a respective schematic diagram illustrating the image processing apparatus 100 according to an embodiment configured to extract a feature from an image of a scene. As will be described in more detail further below, the image processing apparatus 100 shown in FIGS. 1*a*, 1*b* and 1*c* comprises processing circuitry, in particular one or more processors, configured, in response to a feature extraction event, to extract a feature from first image data representing a first image of a scene, wherein the feature extraction event is based on second image data representing a second image of the scene.

FIG. 2 shows a schematic diagram illustrating the image processing apparatus 200 according to a further embodiment configured to extract a feature from an image of a scene. As will be described in more detail further below, the image processing apparatus 200 comprises processing circuitry, in particular one or more processors, configured, in response to a feature extraction event, to extract a feature from first image data representing a first image of a scene, wherein the feature extraction event is based on second image data representing a second image of the scene. The first image and the second image of the scene are generated from a single sensor.

Figure 3:
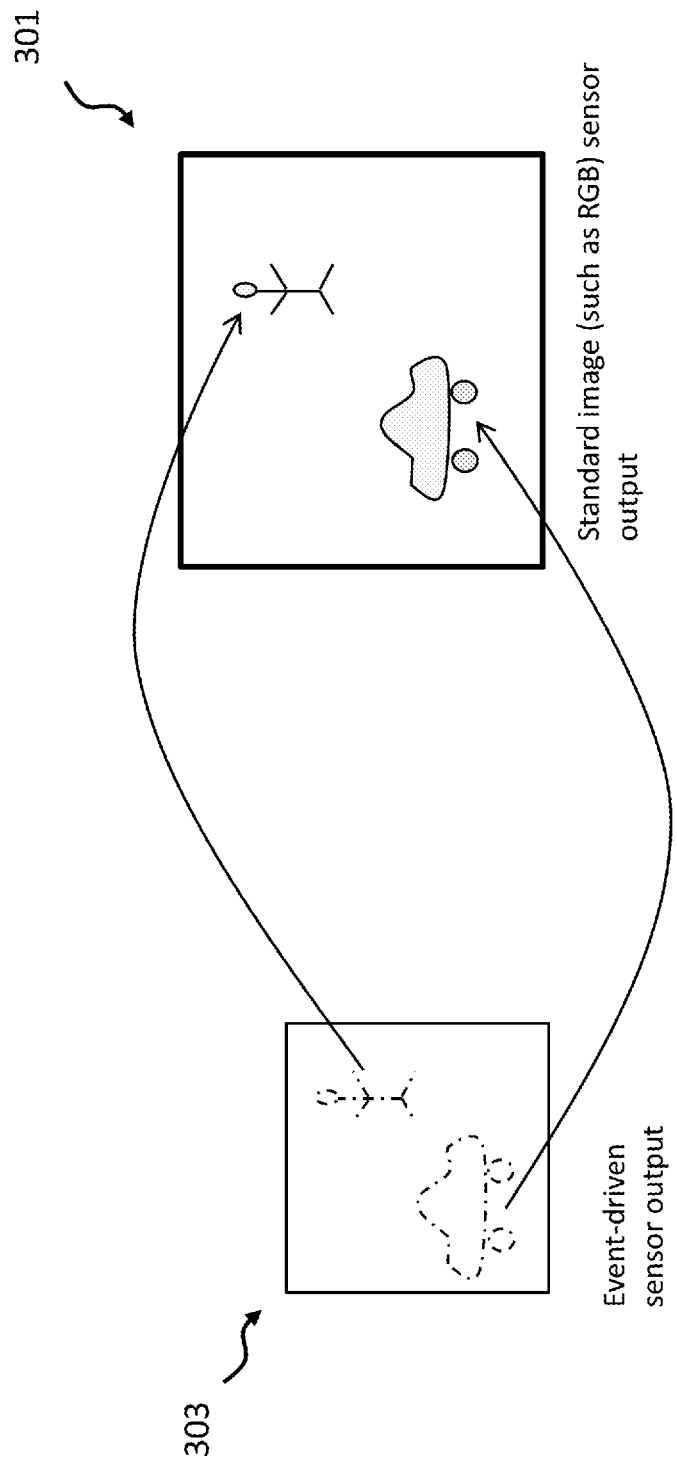
FIG. 3 shows a schematic diagram illustrating an example of a first image and a second image of a scene as processed by an image processing apparatus according to an embodiment.

FIG. 3 shows a schematic diagram illustrating an example of first image data 301 provided by the standard image sensor and second image data 303 provided by the event-driven sensor based on a first image and a second image of a scene as processed by the image processing apparatus 100, 200. As illustrated in FIG. 3, an object from the output of the event-driven sensor could be mapped to the output of the standard image sensor, which allows reducing the complexity of the computation for finding the object and improving the computer vision algorithm performance, such as face recognition rate, car license plate number recognition rate, etc., based on the accurate identification of the object. Moreover, through the exaction of features, the computer vision (CV) algorithm performance can be improved in comparison to conventional methods.

Figure 4A:
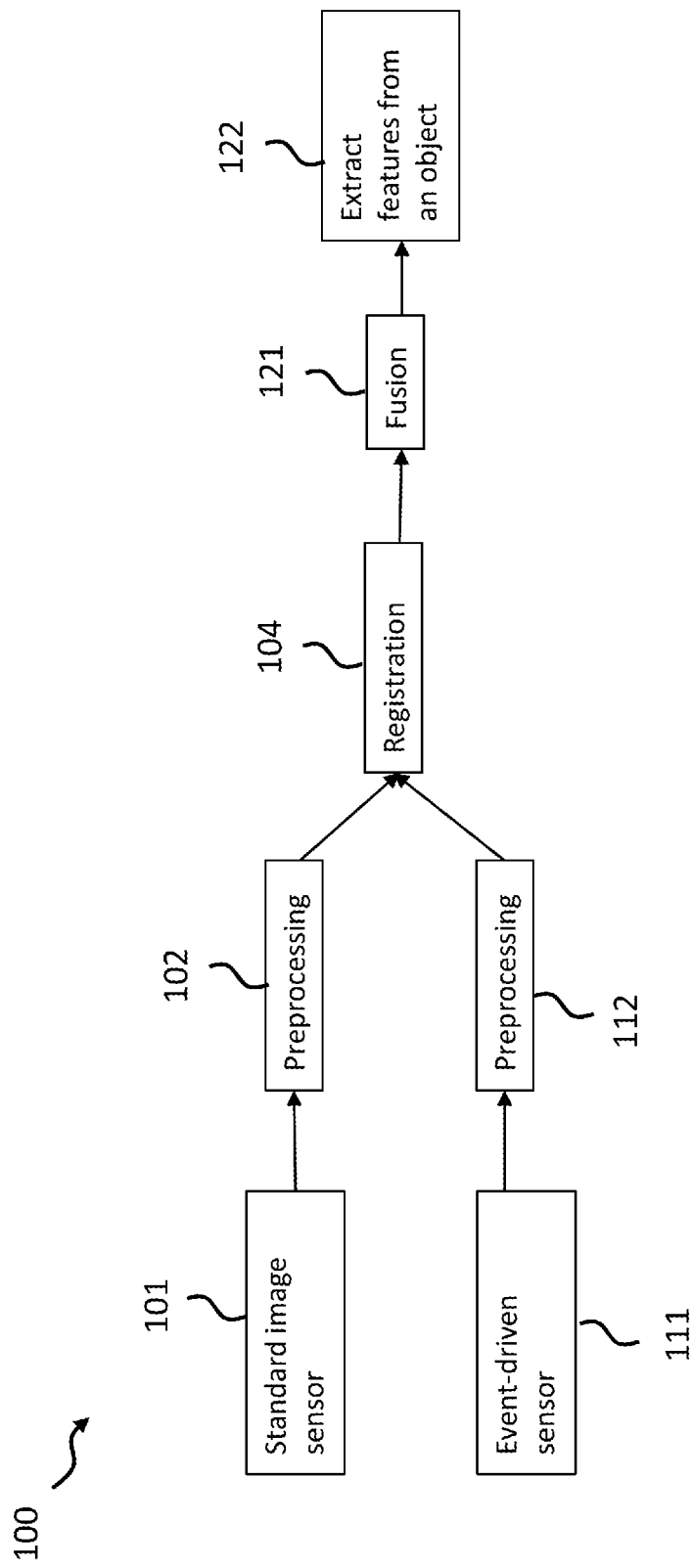

As can be taken from FIGS. 1*a*, 1*b* and 1*c* and as already mentioned above, the image processing apparatus 100 may optionally comprise at least one of a standard image sensor 101 and an event-driven sensor 111 in a dual-sensor set up and/or one or more capturing devices, such as a camera and/or an event-driven camera. Each sensor 101, 111 or camera may have its own optical elements, such as one or more respective lenses 103, 113, and preprocessing blocks 102, 112 (as illustrated in the further embodiment of FIG. 4*a*), such as a respective image signal processor (ISP) 102, 112. After preprocessing, the output of each sensor 101, 111 can be calibrated, corrected and registered, for instance, by the registration block 104 of the image processing apparatus 100 shown in FIG. 4*a*. As illustrated in FIGS. 1*a* and 4*a*, fusion of the images can be performed in a further processing block 121. However, as illustrated in FIG. 1*b*, in embodiments of the invention the fusion block 121 can be omitted.

In an alternative realization, the standard image sensor 101 and an event-driven sensor 111 in a dual-sensor set up and/or one or more capturing devices may be not part of the image processing apparatus. As already described above, the processing circuitry of the image processing apparatus 100 is configured to receive and use the output of the event-driven sensor 111, i.e. the event signal and/or the second image data for identifying an object in the output, i.e. the first image data provided by the standard image sensor 101. As illustrated in FIG. 4*a*, the processing circuitry of the image processing apparatus 100 can comprise a further processing block 122 for extracting one or more features of the identified object and/or for coding for object detection or recognition from the first image or the fusion of the first and second image in a later stage.

In an embodiment, the event-driven sensor/camera 111 may have a smaller resolution than the standard image sensor 101. In an embodiment, the output of the standard image sensor 101 can be downsampled to perform sample/pixel registration for dual sensor output fusion.

The output of the event-driven sensor 111 can comprise motion information or other video characteristic information. This information can be obtained based on the output of the event-driven sensor 111. For instance, the second image or event signal data may include a video frame with a lower resolution than the first image data. Alternatively or in addition, the second image data or event signal data may include a positive/negative amount of the intensity change and the location of the intensity change. The term location refers to the location at which the event occurs, i.e. for instance the coordinate of the respective pixel where the intensity change exceeded a predetermined threshold. The term location may alternatively or in addition refer to the time (i.e. the time stamp) at which the intensity change occurred at said pixel coordinate. The identification of an object and the feature extraction implemented in the image processing apparatus 100, 200 can comprise the following processing stages illustrated in FIG. 4a. A pre-determined threshold can be used to detect an object. If the intensity change is bigger than the pre-determined threshold, the sample is marked as part of an object and an event signal can be generated. In block 104 of FIG. 4a, a mapping from the output of the event-driven sensor 111 can be made to match the sample position in the image of the standard image sensor 101 (e.g. using known pixel registration algorithms, geometric correction could be performed based on the sensor setup). An object is identified in the image of the standard image sensor 101. The feature of the identified object is extracted by a feature extraction method using, for instance, a neural network (block 122 of FIG. 4a). The extracted feature can be coded and transmitted to another entity, such as a cloud server.

Figure 4B:
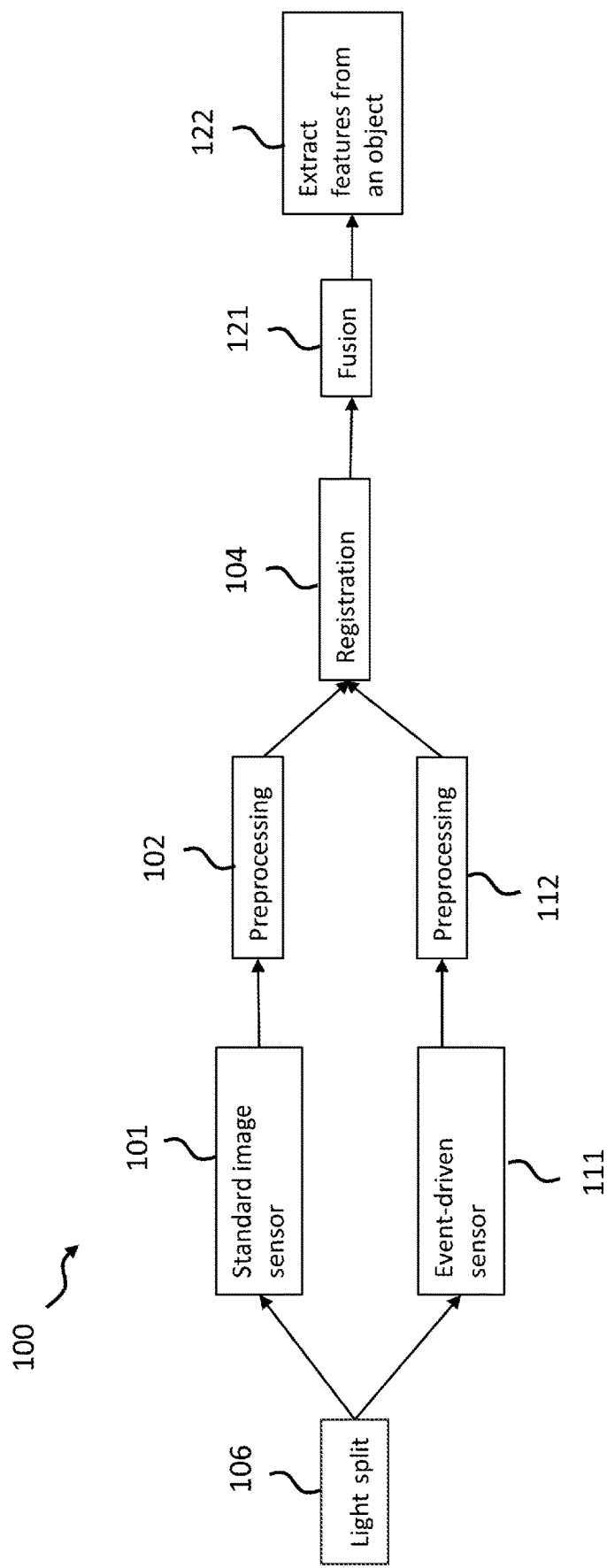
FIG. 4b shows a schematic diagram illustrating a further embodiment of the image processing apparatus of FIG. 1b.

FIG. 4b illustrates a further embodiment of the image processing apparatus 100 shown in FIG. 4a. In the embodiment illustrated in FIG. 4b the image processing apparatus 100 further comprises the optical splitter already described in the context of FIG. 1c.

Figure 5:
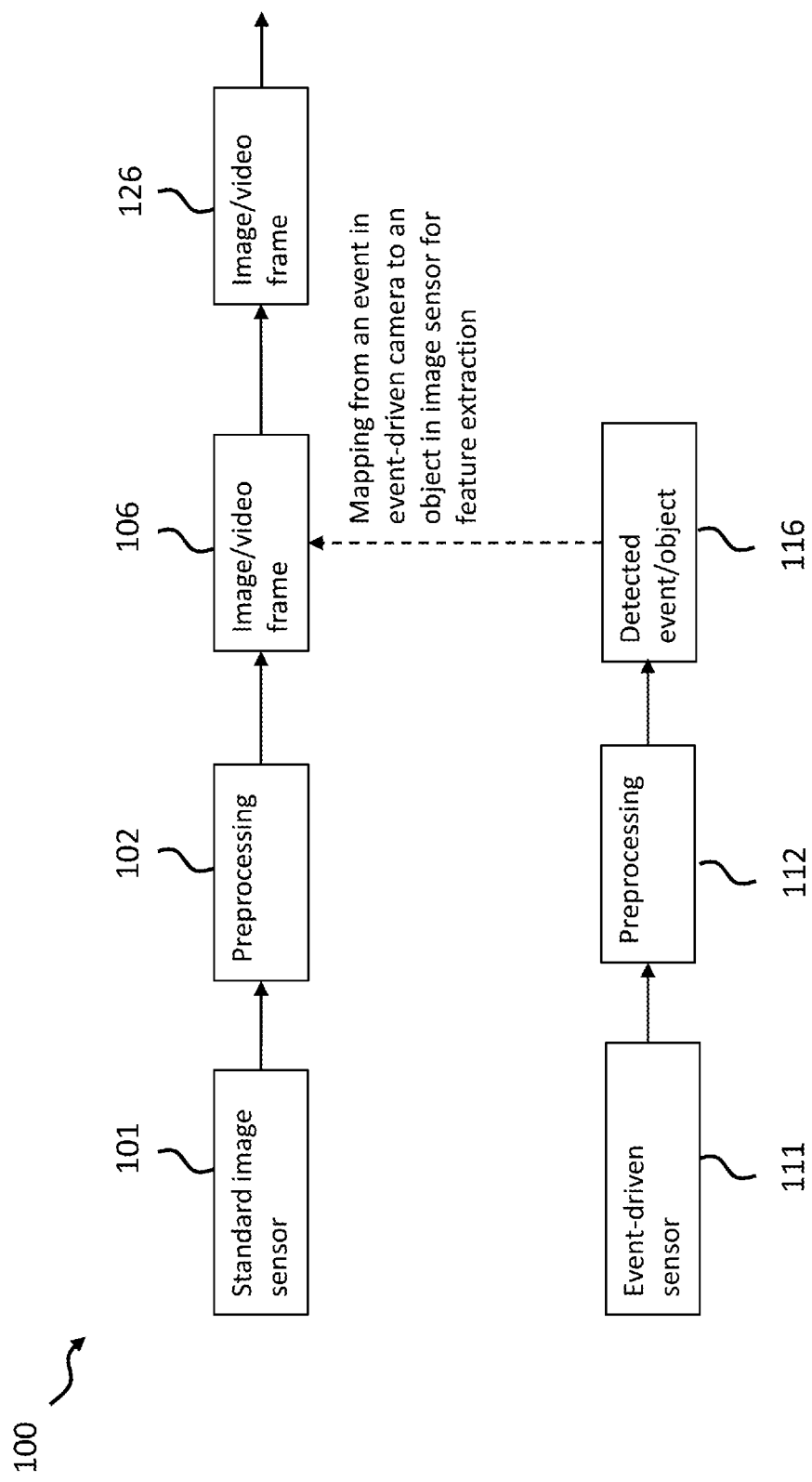
FIG. 5 shows a schematic diagram illustrating a further embodiment of the image processing apparatus of FIG. 1*a*.

In an alternative embodiment, the output of the image sensor 101 and the output of the event sensor 111 are not merged into a single image. However, the event detected in the event sensor 111 can be mapped to identify the object in the output of the image sensor 101, as illustrated in the embodiments of the image processing apparatus 100 shown in FIGS. 1b and 5. After the object is identified, the feature of that object can be further processed.

As can be taken from FIG. 2 and as already mentioned above, for the image processing apparatus 200 of FIG. 2 the combination of a standard image sensor and an event-driven sensor is implemented through a single sensor and optical arrangement, such as one or more lenses 203 and a sensor 201. The sensor 201 is capable of capturing the standard image and the event information. Thus, in comparison with the image processing apparatus 100 of FIG. 1a, the fusion (implemented in block 221 of FIG. 2) of the standard image data, i.e. the first image data and the event data, i.e. the second image data is more straightforward.

Figure 6:
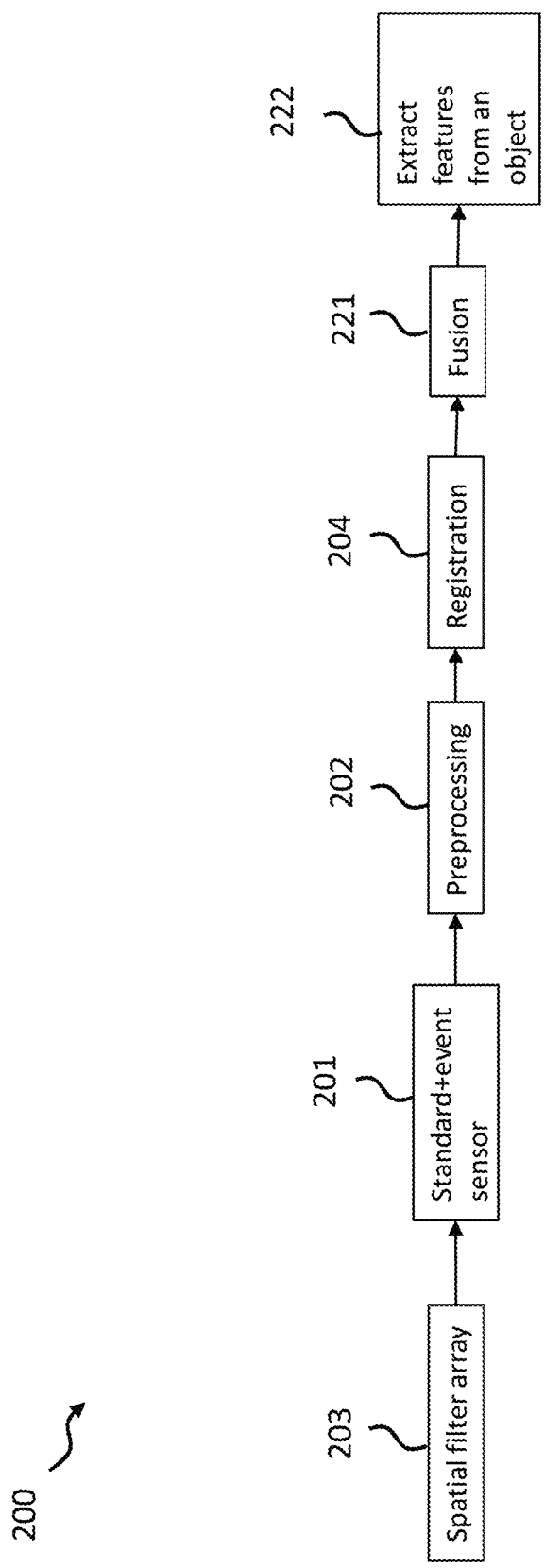
FIG. 6 shows a schematic diagram illustrating a further embodiment of the image processing apparatus of FIG. 2.

The identification of an object and the feature extraction can be done as illustrated in FIG. 6. A pre-determined threshold can be used to detect an object in the second image data. If the intensity change is bigger than the pre-determined threshold, the sample is marked as part of an object and an event signal is generated (block 202 of FIG. 6). A fusion of the image sensor data, i.e. the first image data 301 and the event sensor data, i.e. the second image data 303 can be performed (block 221 of FIG. 6). A mapping from the output of the event vision sensor 103 can be made in block 204 of FIG. 6 to match the sample position in the image 301 of the standard image sensor 201 using, for instance, known pixel registration algorithms. An object is identified in the image of the standard image sensor 201. The feature(s) of the identified object is extracted by a feature extraction method, such as a neural network (block 222 of FIG. 6). The extracted feature can be coded and transmitted to another entity, such as a cloud server.

Figure 7:
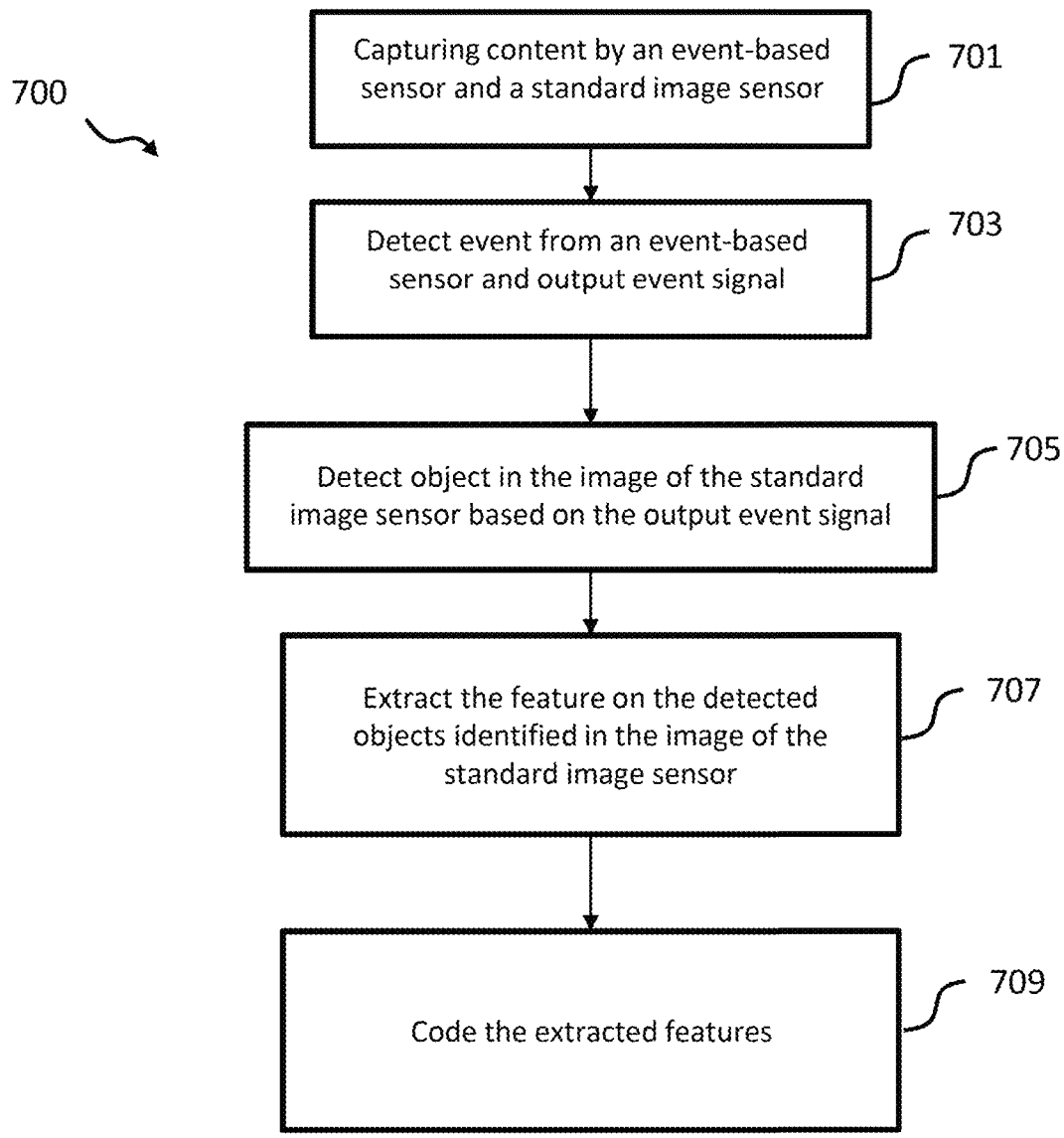
FIG. 7 shows a flow diagram illustrating an example of an image processing method according to an embodiment.

FIG. 7 shows a flow diagram illustrating an example of an image processing method 700 according to an embodiment, which summarizes some of the steps already described above. In a step 701, content is captured by the event-based sensor 103, 201 and a standard imaging sensor 101, 201. In step 703, an event is detected on the basis of the data captured by the event-based sensor 103, 201, i.e. the second image data and an event signal can be generated. In step 705, the object is detected, i.e. identified in the image captured by the standard imaging sensor 101, 201, i.e. the first image data, on the basis of the event signal. In step 707, one or more features of the object identified in the first image data 301 are extracted therefrom. In step 709, the extracted features can be coded.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. An image processing apparatus for extracting a feature from an image of a scene, wherein the apparatus comprises:
   at least one of an optical splitter or a dedicated prism;
   a first imaging sensor;
   a second imaging sensor;
   at least one processor; and
   one or more memories coupled to the at least one processor and storing programming instructions for execution by the at least one processor to:
      receive an optical signal;
      split, using the at least one of the optical splitter or the dedicated prism, the optical signal into a first optical signal and a second optical signal;
      capture, using the first imaging sensor, a first image of the scene using the first optical signal;
      provide first image data representing the first image of the scene;
      capture, using the second imaging sensor, a second image of the scene using the second optical signal;
      provide second image data representing the second image of the scene;
      adjust at least one of a frame rate or a resolution of the first imaging sensor based on a feature extraction event identified from the second image data; and
      in response to the feature extraction event, extract a feature from the first image data.

2. The apparatus of claim 1, wherein the feature extraction event is triggered by reception of a feature extraction event signal by the apparatus, wherein the feature extraction event signal comprises information about a location of the feature to be extracted from the first image data.

3. The apparatus of claim 1, wherein the programming instructions are for execution by the at least one processor to:
   determine, based on the second image data, whether a feature extraction condition is fulfilled; and
   trigger a feature extraction, in response to determining that the feature extraction condition is fulfilled.

4. The apparatus of claim 3, wherein the image is one of a plurality of images of a video stream and wherein the programming instructions are for execution by the at least one processor to:
   determine at least one of motion statistics or sample value change information based on the second image data; and
   determine, based on the at least one of motion statistics or sample value change information, whether the feature extraction condition is fulfilled.

5. The apparatus of claim 4, wherein the programming instructions are for execution by the at least one processor to determine, based on the at least one of motion statistics or sample value change information, whether the feature extraction condition is fulfilled by comparing the at least one of motion statistics or sample value change information with one or more threshold values.

6. The apparatus of claim 1, wherein the first image captured by the first imaging sensor has a higher resolution than the second image captured by the second imaging sensor.

7. The apparatus of claim 6, wherein the programming instructions are for execution by the at least one processor to downsample the first image to a lower resolution of the second image.

8. The apparatus of claim 1, wherein the first imaging sensor is a CMOS sensor and the second imaging sensor is an event sensor.

9. The apparatus of claim 2, wherein the programming instructions are for execution by the at least one processor to identify in the first image data the feature for which the feature extraction condition is fulfilled based on the second image data.

10. The apparatus of claim 1, wherein the first image data comprises a first plurality of sample values and the second image data comprises a second plurality of sample values, and wherein the programming instructions are for execution by the at least one processor to map the first plurality of sample values with the second plurality of sample values.

11. The apparatus of claim 1, wherein the programming instructions are for execution by the at least one processor to generate a composite image by fusing the first image and the second image.

12. The apparatus of claim 11, wherein the programming instructions are for execution by the at least one processor to fuse the first image and the second image after separately performing signal processing on the first image and the second image.

13. The apparatus of claim 12, wherein the at least one processor implements a neural network, wherein the neural network is configured to extract, based on the second image data, the feature from the first image of the scene.

14. An image processing method for extracting a feature from an image of a scene, wherein the method comprises:
   receiving an optical signal;
   splitting, using at least one of an optical splitter or a dedicated prism, the optical signal into a first optical signal and a second optical signal;
   capturing, using a first imaging sensor, a first image of the scene using the first optical signal;
   providing first image data representing the first image of the scene;
   capturing, using a second imaging sensor, a second image of the scene using the second optical signal;
   providing second image data representing the second image of the scene;
   adjusting at least one of a frame rate or a resolution of the first imaging sensor based on a feature extraction event identified from the second image data; and
   extracting, in response to the feature extraction event, a feature from the first image data.

15. A non-transitory computer-readable computer program product comprising program code for execution by at least one processor to:
   receive an optical signal;
   split, using at least one of an optical splitter or a dedicated prism, the optical signal into a first optical signal and a second optical signal;
   capture, using a first imaging sensor, a first image of a scene using the first optical signal;
   provide first image data representing the first image of the scene;
   capture, using a second imaging sensor, a second image of the scene using the second optical signal;
   provide second image data representing the second image of the scene;

adjust at least one of a frame rate or a resolution of the first imaging sensor based on a feature extraction event identified from the second image data; and extract, in response to the feature extraction event, a feature from the first image data.

16. The non-transitory computer-readable computer program product of claim 15, wherein the feature extraction event is triggered by reception of a feature extraction event signal, wherein the feature extraction event signal comprises information about a location of the feature to be extracted from the first image data.

17. The non-transitory computer-readable computer program product of claim 15, wherein the program code is for execution by the at least one processor to:

determine, based on the second image data, whether a feature extraction condition is fulfilled; and trigger a feature extraction, in response to determining that the feature extraction condition is fulfilled.

* * * * *